United States Patent [19]
Diederiks, Jr. et al.

[11] Patent Number: 5,735,424
[45] Date of Patent: Apr. 7, 1998

[54] FUEL PORT ACCESS DOOR CONNECTED AUTOMOBILE GAS CAP ASSEMBLY

[76] Inventors: Everett G. Diederiks, Jr., 12804 Valleyhill St., Lake Ridge, Va. 22192; Edwin E. Puett, Jr., 101 SE. Ontario Way, Stuart, Fla. 34997

[21] Appl. No.: 503,951

[22] Filed: Jul. 19, 1995

[51] Int. Cl.$^6$ .................................................. B65D 51/16
[52] U.S. Cl. ............... 220/203.01; 16/361; 16/366; 217/60 E; 220/86.2; 220/89.1; 220/259; 220/335; 220/DIG. 33
[58] Field of Search ................ 280/834; 292/268, 292/338; 215/306; 220/203.01, 203.05, 203.06, 203.21, 203.23, 86.2, 89.1, DIG. 33, 259.315, 375, 326, 335, 764; 296/97.22; 217/60 E, 60 G; 16/361, 366

[56] References Cited

U.S. PATENT DOCUMENTS

| | | | |
|---|---|---|---|
| 574,837 | 1/1897 | Tritt . | |
| 1,199,680 | 9/1916 | Fabian | 220/764 |
| 1,925,079 | 9/1933 | Allred . | |
| 1,978,314 | 10/1934 | Lancaster | 220/259 X |
| 2,017,837 | 10/1935 | Anschicks . | |
| 2,070,663 | 2/1937 | Klein et al. | 220/335 X |
| 2,212,977 | 8/1940 | DeBoer et al. | 217/60 E |
| 2,314,710 | 3/1943 | Keller | 296/97.22 X |
| 2,597,014 | 5/1952 | Mariani | 220/315 X |
| 2,680,477 | 6/1954 | Schira, Jr. . | |
| 2,723,746 | 11/1955 | Stevenson et al. | 220/315 X |
| 3,093,258 | 6/1963 | Turner | 217/60 E |
| 3,140,794 | 7/1964 | Arndt et al. | 220/303 |
| 3,612,338 | 10/1971 | Ekman | 220/86.2 X |
| 3,813,904 | 6/1974 | Wallskog | 220/326 X |
| 3,820,680 | 6/1974 | Friend . | |
| 3,903,942 | 9/1975 | Vest | 220/86.2 X |
| 3,905,637 | 9/1975 | Smith | 296/97.22 |
| 4,040,654 | 8/1977 | Hill et al. | 217/60 E X |
| 4,091,955 | 5/1978 | Sloan, Sr. . | |
| 4,091,959 | 5/1978 | O'Banion . | |
| 4,146,146 | 3/1979 | Mar . | |
| 4,170,315 | 10/1979 | Dubach et al. . | |
| 4,177,931 | 12/1979 | Evans . | |
| 4,257,642 | 3/1981 | Sampson | 292/338 X |
| 4,312,649 | 1/1982 | Fujii et al. . | |
| 4,337,873 | 7/1982 | Johnson . | |
| 4,361,252 | 11/1982 | Black et al. . | |
| 4,429,933 | 2/1984 | Sokolowski | 217/60 E X |
| 4,432,120 | 2/1984 | Sherman, Jr. et al. . | |
| 4,482,075 | 11/1984 | Stotz et al. | 220/86.2 |
| 4,498,600 | 2/1985 | Blion . | |
| 4,555,041 | 11/1985 | Muehl . | |
| 4,576,308 | 3/1986 | Sullivan . | |
| 4,653,711 | 3/1987 | Marshell . | |
| 4,676,390 | 6/1987 | Harris . | |
| 4,676,393 | 6/1987 | Daniel | 220/DIG. 33 X |
| 4,678,097 | 7/1987 | Crute . | |
| 4,705,190 | 11/1987 | Mizusawa . | |
| 4,738,376 | 4/1988 | Markus . | |

(List continued on next page.)

FOREIGN PATENT DOCUMENTS

306622  7/1955  Switzerland ............. 220/203.01

*Primary Examiner*—Allan N. Shoap
*Assistant Examiner*—Robin A. Hylton
*Attorney, Agent, or Firm*—Everett G. Diederiks, Jr.

[57] ABSTRACT

A gas cap assembly for use on an automobile having a pivotable gas filling port access door is provided wherein access to the filling port of the automobile's gas tank is automatically provided upon pivoting of the access door. The gas cap assembly includes a body unit that is adapted to be sealingly engaged about the filling port of the fuel fill tube associated with the gas tank and which includes a central opening for receiving a gas filling nozzle; a cover member that is movably attached to the body unit between a closed position in which the cover member is sealed against the central opening and an open position wherein direct access to the central opening is provided; and an arrangement for interconnecting the cover member with the pivotable access door such that opening of the access door automatically shifts the cover member from its closed to open positions. A spring arrangement is provided to bias the cover member towards the closed position.

20 Claims, 6 Drawing Sheets

U.S. PATENT DOCUMENTS

| | | |
|---|---|---|
| 4,744,482 | 5/1988 | Ohsawa . |
| 4,762,247 | 8/1988 | Temmesfeld . |
| 4,776,486 | 10/1988 | Mizusawa . |
| 4,811,763 | 3/1989 | Kupske . |
| 4,867,337 | 9/1989 | Eichenseer . |
| 4,881,655 | 11/1989 | Jansky et al. . |
| 4,913,303 | 4/1990 | Harris . |
| 4,979,634 | 12/1990 | Begley ................... 220/335 X |
| 5,000,339 | 3/1991 | Wheat et al. . |
| 5,004,114 | 4/1991 | Terbrusch et al. . |
| 5,042,678 | 8/1991 | Munguia . |
| 5,108,001 | 4/1992 | Harris . |
| 5,141,124 | 8/1992 | Smith et al. ................... 220/335 X |
| 5,195,566 | 3/1993 | Ott et al. . |
| 5,234,122 | 8/1993 | Cherng ................... 296/97.22 X |
| 5,238,136 | 8/1993 | Kasugai et al. . |
| 5,253,920 | 10/1993 | Eldridge ................... 296/97.22 |
| 5,275,213 | 1/1994 | Perkins ................... 220/DIG. 33 X |
| 5,297,595 | 3/1994 | Haile et al. . |
| 5,529,201 | 6/1996 | Tallent et al. ................... 220/86.2 |

FUEL PORT ACCESS DOOR CONNECTED AUTOMOBILE GAS CAP ASSEMBLY

BACKGROUND OF THE INVENTION

1. Field of the Invention

The present invention pertains to a novel gas cap assembly for use on a vehicle and more particularly to a gas cap assembly for use on an automobile having a pivotable fill tube access door.

2. Discussion of the Prior Art

The majority of automobile gas cap arrangements comprise a gas cap, having a pressure relief valve, threadably received within an internally threaded gas tank fill tube. The gas cap is generally located behind a pivotable access door which covers a filling zone and is either manually opened or remotely opened by a lever/switch located in the passenger compartment. If remotely controlled, these access doors are spring biased to an open position and retained in a closed position by a latch which is releasable by the lever/switch. In this type of arrangement, filling the gas tank requires releasing/pivoting the access door and manually unscrewing the gas cap. Fairly often, these gas caps are inadvertently left at the gas station after filling the tank.

Some automobile manufacturers have resorted to incorporating a retaining member in attempting to avert the loss of the gas cap, such as tethering the gas cap to the fill tube or mounting a retainer cup on the back of the access door for supporting the gas cap after it is manually unscrewed from the fill tube. Such arrangements, if used, minimize the chances of losing ones' gas cap but still require the gas cap to be manually removed, placed in a non-obstructing position during filling of the tank, and reattached to the fill tube after the filling operation.

Gas cap assemblies which do not require the gas cap to be removed for filling purposes have also been proposed in the art. These prior art arrangements include threadable gas caps having sealable covers which are either pivoted inward into the filling zone or outward to provide access to the filling zone. The prior art directed to outwardly pivoting covers requires the covers to be manually shifted to provide access to the filling zone. Pivoting such covers inwardly creates numerous problems basically due to the need for accommodating a pressure relief valving arrangement between the seal of the cover and the filling zone. An additional problem associated with these known prior art arrangements is that pressure from fuel vapor can result in fuel and fuel vapor escaping from the fill tube as the filling zone is being accessed. This rapid escape or surge of fuel and/or fuel vapor can result in the emissions of potentially dangerous fuel vapor concentration levels, as well as the potential for a person accessing the filling zone to be injured. Many other prior art arrangements have attempted to overcome this potentially dangerous situation but only through designing gas caps having rather complex pressure relief valving structure. Mainly due to this complex valving structure, none of these additional prior art arrangements are proposed in combination with a gas cap having a pivotable cover, but rather are all directed to more conventionally known gas caps which are threadably removed to provide access to the filling zone.

Therefore, there exists a need in the art for a gas cap assembly for use on an automobile having a pivotable fill tube access door which will enable the filling zone to be readily accessed once the access door is opened, prevents the possibility of the gas cap being misplaced, is simple in construction so as to be economically feasible, readily retrofits to existing automobile gas fill tubes and represents a safe design.

SUMMARY OF THE INVENTION

A gas cap assembly for use on an automobile having a pivotable gas fill tube access door, which generally constitutes an extension of a side panel of the automobile, is provided wherein access to the filling port of the automobile's gas tank is automatically provided upon pivoting of the access door.

More specifically, the gas cap assembly includes a body unit that is adapted to be sealingly engaged about the filling port of the fuel fill tube associated with the gas tank and which includes a central opening for receiving a gas filling nozzle; a cover member that is movably attached to the body unit between a closed position in which the cover member is sealed against the central opening and an open position wherein direct access to the central opening is provided; and an arrangement for interconnecting the cover member with the pivotable access door such that opening of the access door automatically shifts the cover member from its closed to open positions. In addition, a spring arrangement is provided to bias the cover member towards the closed position to assure a fluid tight seal.

In a preferred embodiment, the body unit includes an inner tubular portion that defines the central opening and which is externally threaded in order to enable the tubular portion to be readily secured to an existing internally threaded fill tube, as well as a cap portion that extends about and is rotatably attached to the inner tubular portion. The cover member is pivotally attached to the cap portion. A ratcheting arrangement is provided between the inner tubular portion and the cap portion such that the cap portion can be grasped to tighten the gas cap to the fuel fill tube and to align the cover member such that the axis about which the cover member pivots is on the same side as the axis about which the access door pivots. The cover member is attached to the access door through a suitable interconnection such that opening of the access door will automatically result in pivoting of the cover member relative to the inner tubular member and the cap member.

When the gas cap assembly of the present invention is used with automobiles having pivotable access doors which are retained in an open position through the use of a camming arrangement or some sort of detent mechanism, the cover member would preferably be interconnected with the access door through a flexible plastic tether line. If used on an automobile having an access door which is not positively maintained in an open position such that the biasing force acting on the cover member to seal the same would force the access door to be manually maintained open to provide accessibility to the filling port, the gas cap assembly would incorporate a linkage assembly interconnecting the cover member and the access door, as well as a detent mechanism for maintaining the cover member in its open position against the biasing force acting on the cover member until the access door is closed.

Additional features and advantages of the gas cap assembly of the present invention will become more readily apparent from the following detailed description of preferred embodiments thereof, when taken in conjunction with the following drawings wherein like reference numerals refer to corresponding parts in the several views.

DETAILED DESCRIPTION OF THE PREFERRED EMBODIMENTS

Figure 1:
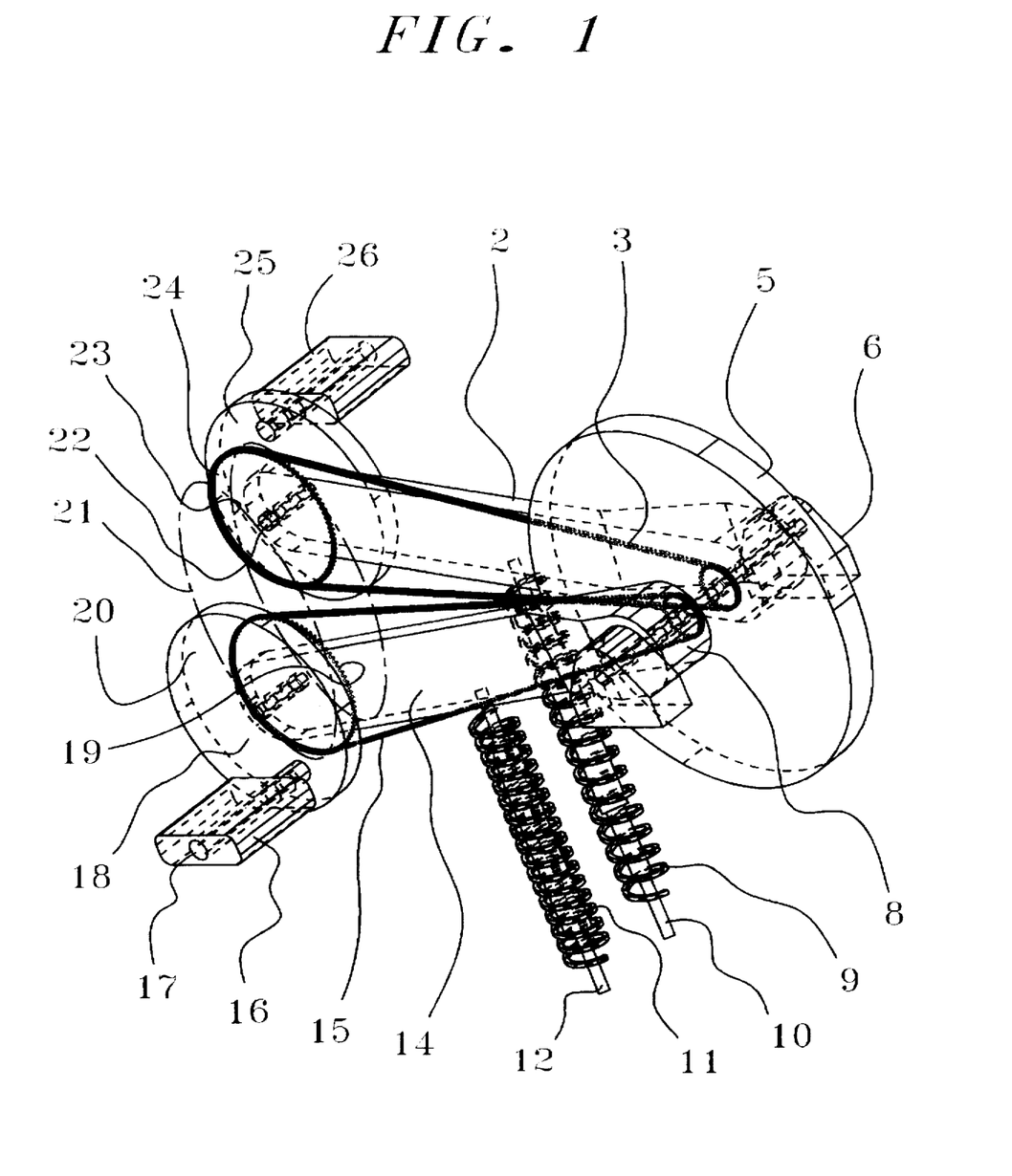
FIG. 1 is a perspective view of the gas cap assembly shown attached to a gas fill tube and interconnected with a filling tube access door through a connection member constructed in accordance with a first embodiment of the invention.

With initial reference to FIG. 1, the gas cap assembly of the invention is generally indicated at 2. Gas cap assembly 2 is adapted to be attached to a fuel fill tube 5 that projects into a recessed cavity 8 that is adapted to be closed off by means of an access door 12. In the embodiment shown which is intended to depict an exemplary fill tube/access door arrangement, access door 12 is pivotable relative to recessed cavity 8 through a hinge unit 16 that includes a first hinge plate 19 that is secured within recessed cavity 8 by means of screws 22 and 23 and a second hinge plate 26 that is affixed to access door 12 such as by spot welds at 29 and 30.

A spring 32 is arranged about a pivoting axis associated with hinge unit 16 and biases access door 12 to the open position illustrated in FIG. 1. For this purpose, spring 32 has an upper end 34 which engages first hinge plate 19 and a lower end 36 which engages second hinge plate 26. Although not shown in this Figure, it should be recognized that it is common in this field to have the opening of access door 12 controlled through the use of a remote control lever/switch (not shown) located in the passenger compartment of the automobile. With such a known arrangement, remotely controlling the lever/switch would cause access door 12 to be released and, due to the presence of spring 32, access door 12 would shift to an open position as illustrated in this Figure. As will be more fully discussed below, this shifting of access door 12 will enable direct access to fuel fill tube 5 due to the construction of gas cap assembly 2.

As generally shown in FIG. 1, gas cap assembly 2 includes a cap portion 41 adapted to be secured to fuel fill tube 5, an inner tubular portion 45 which extends within fuel fill tube 5 and a cover member 48 that is pivotally attached to cap portion 41 in the manner which will be described below. In the preferred embodiment, cover member 48 has an inner surface 49 against which a sealing member 51 that is adapted to seal against inner tubular portion 45 is positioned. In addition, in the preferred embodiment, gas cap assembly 2 includes a pressure relief valve unit 54 that is fixed to inner surface 49 of cover member 48.

With this pivoting arrangement of cover member 48, cover member 48 can assume an open position as illustrated in FIG. 1, wherein direct access to fuel fill tube 5 is provided and can be pivoted to a closed position wherein pressure relief valve unit 54 projects within inner tubular portion 45 and gasket 51 is sealed against inner tubular portion 45. In accordance with the invention, cover member 48 is pivoted to the open position as shown in FIG. 1 automatically upon the opening of access door 12. To accomplish this function in the embodiment of FIG. 1, a flexible tether 56, preferably formed of plastic, is interconnected between cover member 48 and access door 12. More specifically, tether 56 has a first end 58 that is connected to cover member 48 and a second end 60 that is secured to access door 12 by means of a mounting block 62. Mounting block 62 can itself be secured to access door 12 in any number of ways including being simply adhesively secured thereto. Additional details of the above-described arrangement will become more readily apparent from the following detailed description made with reference to FIGS. 2 and 3.

Figure 2:
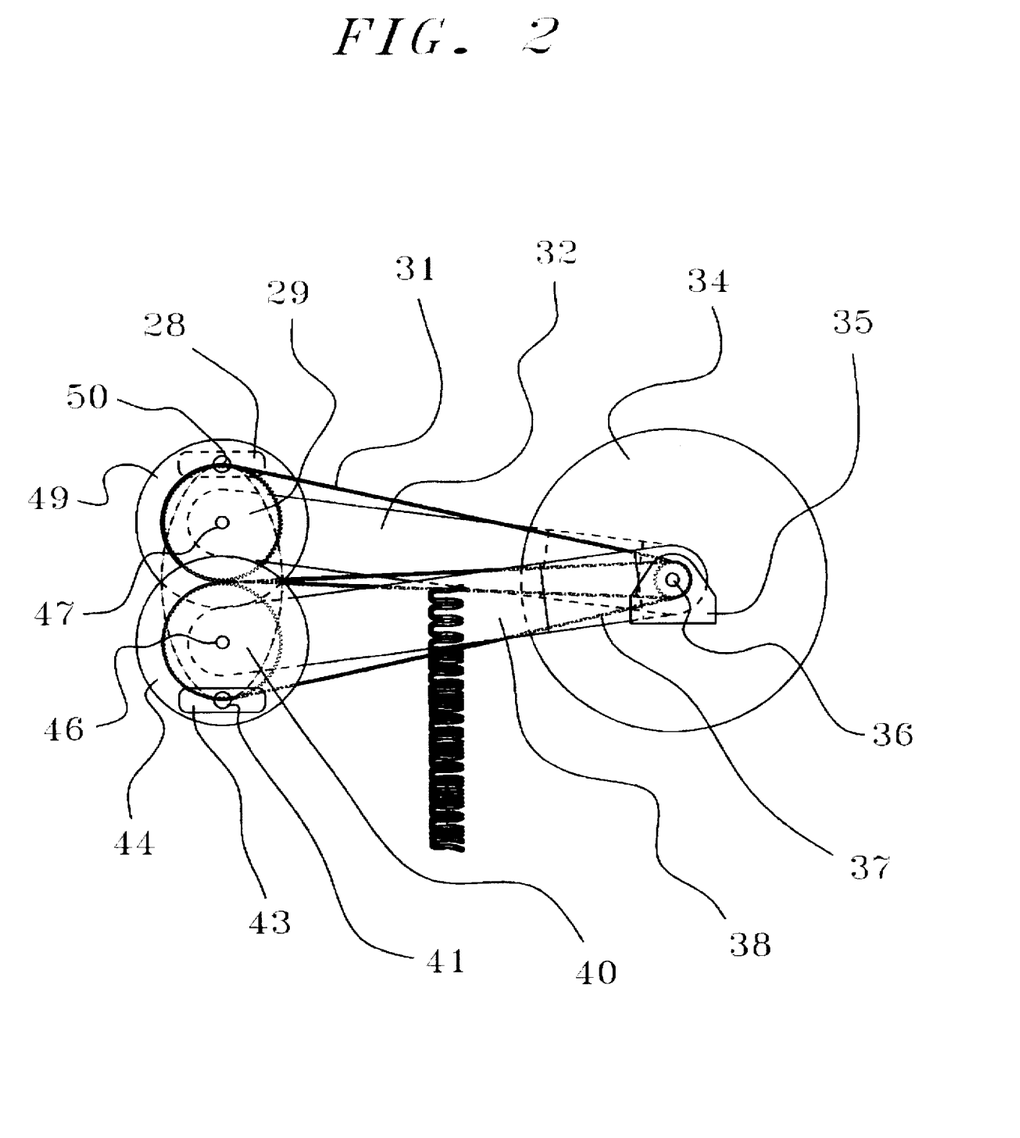
FIG. 2 is a cross-sectional side view of a portion of the gas cap assembly of the invention.

With initial reference to FIG. 2, cap portion 41 actually constitutes a rotatable cap member 71 that is formed of a horizontal portion 74 having a central opening 76 and an annular vertical portion 79. Horizontal portion 74 is provided with plurality of circumferentially spaced and downwardly extending tabs 82 that form part of a ratcheting mechanism 84 as will be more fully described below.

Inner tubular portion 45 of gas cap assembly 2 is preferably constituted by a tubular member 87 that has a smooth inner surface 90 and a threaded outer surface 92. Tubular member 87 has an open upper end that is beveled at 95 against which is sealed sealing member 51 when cover member 48 is closed. Tubular member 87 also includes an annular, radially outwardly extending flange 98 that is provided with an upper annular grooved section 101 within which are located a plurality of circumferentially spaced ramps 104. Ramps 104 cooperate with tabs 82 to constitute ratcheting mechanism 84 in a manner generally known in the art. More specifically, ratcheting mechanism 84 permits tubular member 87 to be threadably attached to fuel fill tube 5 by manually rotating cap member 71 until an annular gasket 105 that extends about tubular member 87 is sealed against fuel fill tube 5. However, gas cap assembly 2 cannot be overtightened since any further rotation of cap member 71 will be made without corresponding rotation of tubular member 87 due to the presence of ratcheting mechanism 84. Of course, ratcheting mechanism 84 only operates unidirectionally such that rotation of cap member 71 in a direction to remove tubular member 87 from within fuel fill tube 5 will also result in a corresponding rotation of tubular member 87. Furthermore, in the embodiment depicted, cap member 71 is maintained in a position about tubular member 87 by means of an annular retaining member 107 which is secured to cap member 71 at annular vertical portion 79. At this point, it should be recognized that, within the spirit of the invention, cap member 71 could function as cover member 48 as well by being pivotable relative to tubular member 87 through a spring biased hinge connection with annular retaining member 107 while still permitting ratcheting mechanism 84 to function in the manner described above, however, providing the separate cover member 48 is preferred.

Figure 3:
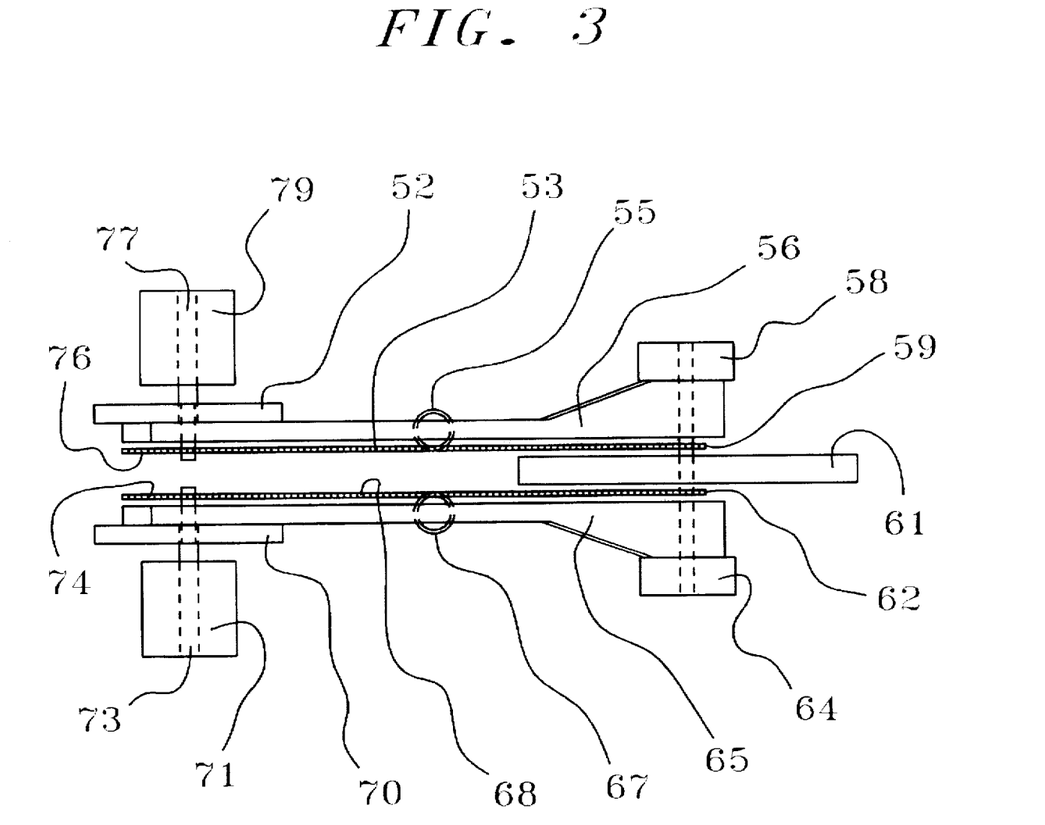
FIG. 3 is a partial cross-sectional top view of a portion of the gas cap assembly of the invention.

As clearly shown in FIGS. 2 and 3, fixedly secured atop cap member 71, or integrally formed therewith, is a support housing 118 into which a pair of extensions 122 and 123 of cap member 71 project. Each extension 122, 123 is provided with a respective bore 126, 127. Support housing 118 is generally U-shaped in cross-section and includes a base 131 and a pair of substantially parallel side legs 133 and 134. Side legs 133 and 134 include respective apertures 137 and 138 which receive an axle 141 that also extends through bores 126 and 127 of extensions 122 and 123.

From the above description, it should be readily apparent that the interconnection of extensions 122 and 123 to legs 133 and 134 through axle 141 enables cover member 48 to pivot relative to cap member 71. In addition, encircling a portion of axle 141 is a spring 144 that has a first end 146 that engages extension 122 and a second end 147 that is received within a groove 149 formed in base 131 of support housing 118. Spring 144 thereby biases cover member 48 to the closed position shown in FIG. 2 wherein sealing member 51 is deformably sealed against beveled open upper end 95 of tubular member 87. Therefore, with this construction, tubular member 87 is fluidly sealed against fuel fill tube 5 both on its outer surface by means of annular gasket 105 and at its beveled open upper end 95 by means of sealing member 51 when cover member 48 is in its closed position.

Although numerous different configurations for pressure relief valve unit 54 could be utilized to perform the function of simply relieving any super-atmospheric pressures from within fuel fill tube 5, one exemplary embodiment will now be described with particular reference to FIG. 2. As shown in this figure, pressure relief valve unit 54 includes an outer housing 153 that is fixed to inner surface 49 of cover member 48. Outer housing 153 includes an annular side wall 156 and a lower wall 159. Lower wall 159 is provided with a central opening 162 having an inner lower surface 165 against which is positioned a first guide member 168 that is defined by an annular upstanding wall 170 and an outwardly projecting base 171.

A second guide member 174 is spaced from first guide member 168 and is adapted to abut inner wall 49 of cover member 48. Second guide member 174 actually includes an annular upstanding wall 175 and a base 176 that is provided with various through holes 179. An annular recess (not labeled) is formed in lower surface 165 within which is positioned an O-ring 184. A ball-type valve member 187 is arranged within first guide member 168 and is biased into sealing engagement with O-ring 184 by means of a spring 190 which extends between valve member 187 and base 176 of second guide member 174.

With this arrangement, when the pressure within fuel fill tube 5 reaches a super-atmospheric pressure, valve member 187 will be shifted against the biasing force of spring 190 and the pressure will be relieved through central opening 162, past O-ring 184, between valve member 187 and annular upstanding wall 170 of first guide member 168, within through holes 179 provided in base 176 and out cover member 48 through a plurality of vent holes 194. Vent holes 194 are preferably interconnected by means of a groove 197 formed in inner surface 49 of cover member 48. As is known in this art, the rate of spring 190 is predetermined so as to preset the level of pressure relief.

Again, the particular structure of pressure relief valve unit 54 can be varied widely without departing from the spirit of the invention. It is preferable that pressure relief valve unit 54 be carried by inner surface 49 of cover member 48 such that pressure relief valve unit 54 can be constructed in a relatively simple manner. It is possible to incorporate more complicated pressure relief valving arrangements that would permit the release of pressure through tubular member 87 as well. In addition, it is also possible to simply calibrate spring 144 such that, in addition to biasing cover member 48 to its closed position, spring 144 could be used in combination with cover member 48 to provide the relief function whereby cover 48 would pivot about axle 141 against the biasing force of spring 144 upon a predetermined pressure acting upon cover member 48 from within tubular member 87.

As best shown in FIGS. 2 and 3, a bracket 201 is formed atop cover member 48 at a position spaced from a center of cover member 48 opposite support housing 118. Bracket 201 is provided with a through hole 203. In the preferred embodiment shown in FIG. 1, first end 58 of tether 56 is secured to bracket 201 by means of through hole 203. As indicated above, second end 60 of tether 56 is secured to access door 12 through mounting block 62. With this construction, cover member 48 will be maintained in a closed position with sealing member 51 being sealed against tubular member 87 so long as access door 12 is substantially closed. When access door 12 is opened and maintained in this position by means of spring 32 or a detent mechanism (not shown), cover member 48 will automatically by pivoted about axle 141 to the open position illustrated in FIG. 1 wherein direct access to fuel fill tube 5 through tubular member 87 is provided. In this position of cover member 48, a gasoline fuel filling nozzle can be directly inserted within tubular member 87 to fill the gas tank of the automobile. Once filling of the gas tank is completed, merely closing of access door 12 will automatically result in pivoting of cover member 48 to its closed and sealed position.

Based on the above description it should be readily apparent that, once the gas cap assembly 2 of the present invention is installed and interconnected with access door 12, when access door 12 is pivoted, either through the use of a lever/switch located in the passenger compartment or manually, cover member 48 of gas cap assembly 2 will be simultaneously pivoted to automatically provide access to the fuel fill tube 5. This arrangement will advantageously provide for the emission of potentially dangerous fuel and/or fuel vapor while the operator is located at a fair distance from cover member 48 since the gas cap assembly 2 is not directly manipulated by the operator.

Figure 4:
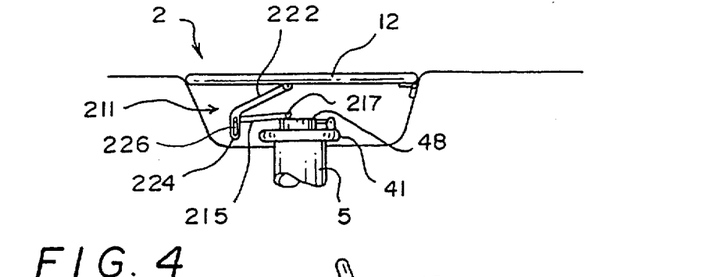
FIG. 4 is a schematic side view of the gas cap assembly constructed in accordance with a second embodiment of the invention shown in a closed position.
Figure 5:
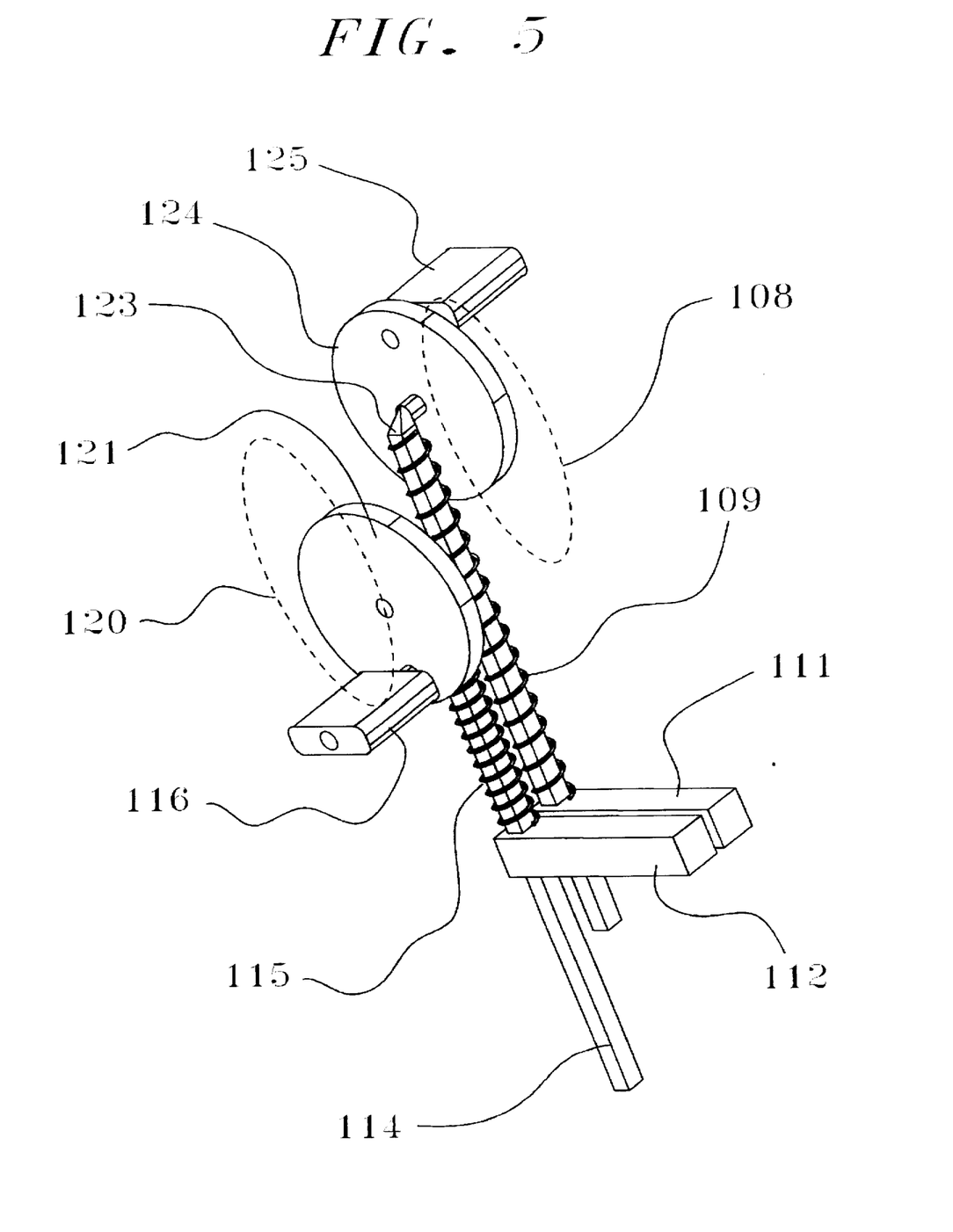
FIG. 5 is a schematic side view of the gas cap assembly of FIG. 4 in an open position.

Since many vehicle access doors 12 are only spring biased to open a slight distance upon activating a lever/switch located in the passenger compartment of the automobile and are not maintained in a wide open position by either a spring, detent mechanism or the like, it is contemplated that the gas cap assembly 2 of the present invention can also utilize a linkage assembly, generally indicated at 211 in FIGS. 4 and 5, in place of tether 56. In accordance with this preferred embodiment linkage assembly 211 includes a first link member 215 having a first end portion 217 pivotally attached to bracket 201 and a second end portion 219 that is pivotally attached to a second link member 222. Second link member 222 actually incorporates a first end portion 224 that is provided with a slot 226 to which second end portion 219 of first link member 215 is slidably and pivotally attached. Second link member 222 includes a second end portion 229 that is pivotally attached to mounting block 62 on access door 12.

As clearly shown in FIGS. 4 and 5, first end portion 224 of second link member 222 is arranged at an angle relative to second end portion 229 such that second link member 222 is longer than first link member 215. When access door is closed as illustrated in FIG. 4, cover member 48 will also be closed since it is spring biased to a closed position by means of spring 144 in the manner heretofore described. When access door 12 is pivoted to an open position (access door 12 being shown substantially fully open in FIG. 5), cover member 48 is likewise pivoted to an open position against the biasing force of spring 144.

In order to maintain cover member 48 in the open position during a filling operation without the need to manually hold access door open, the embodiment of FIGS. 4–6 preferably incorporates a detent mechanism 232 as will now be described with particular reference to FIG. 6. In the preferred embodiment shown in this Figure, attached to base 131 of support housing 118 by any means known in the art such as a pair of spaced rivets 234 and 235, is a spring member 237. Each end of spring member 237 includes an inwardly angled surface 240 and an outwardly angled surface 242. In addition, each end is arranged juxtaposed a respective recess 245, 246 provided respectively in legs 133 and 134 at a position spaced above and preferably slightly forwardly of axle 141.

Figure 6:
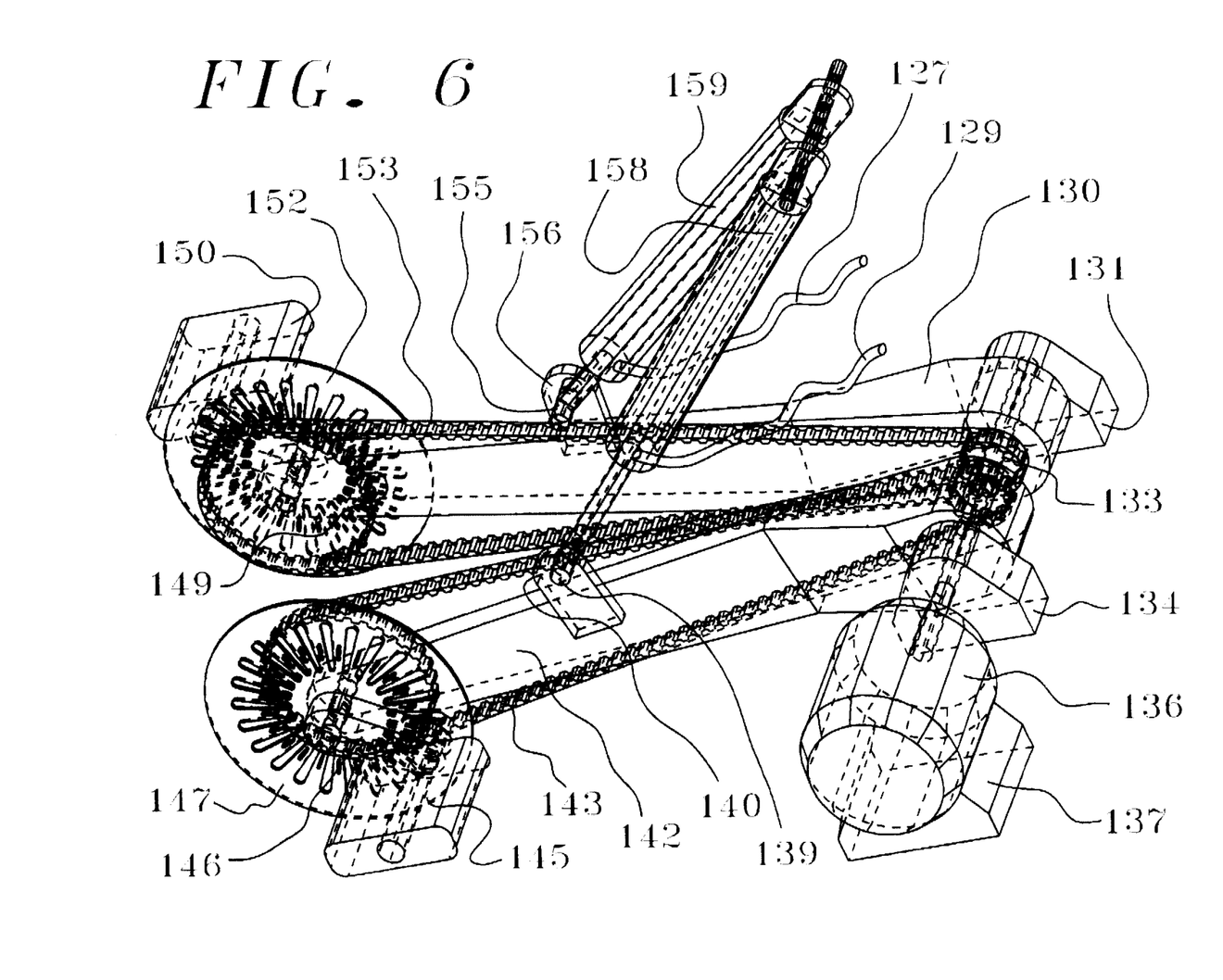
FIG. 6 is a partial cross-sectional top view of a portion of the gas cap assembly of FIGS. 4 and 5 illustrating a preferred detent mechanism incorporated therein.

Due to the presence of detent mechanism 232, when cover member 48 in the embodiment of FIGS. 4-6 is pivoted to an open position, extensions 122 and 123 of cover member 48 will initially engage inwardly angled surfaces 240 to cause the ends of spring member 237 to project into recesses 245 and 246. As cover member continues to pivot open, extensions 122 and 123 will engage outwardly angled surfaces 242 such that the ends of spring member 237 will again extend out of recesses 245 and 246. In this position, cover member 48 will be positively maintained in an open position. When the filling operation is complete and access door 12 is manually pivoted to a closed position, extensions 122 and 123 will initially ride upon outwardly angled surfaces 242 to again force the ends of spring member 237 to extend within recesses 245 and 246. Continued closing of access door 12 will enable cover member 48 to become completely disengaged from spring member 237 and again cover member 48 will be biased to a closed and sealed position.

From the above description of the second preferred embodiment, it should be readily apparent that spring member 237 is elastic and it requires a higher force to bias the ends of spring member 237 into recesses 245 and 246 than is associated with the closing force of spring 144. In this embodiment, spring member 237 is preferably formed of metal, however, other materials could also be readily utilized. In addition, it should be recognized that various other arrangements could be provided to maintain cover member 48 open when used in combination with an access door 12 that is not itself positively maintained in an open state.

From the above detailed description of the preferred embodiment of the invention, it should be readily apparent of the gas cap assembly 2 of the present invention need not be removed from the fuel fill tube 5 once initially attached thereto and that the mere pivoting of access door 12 automatically provides for direct access to fuel fill tube 5 or the sealing thereof. Only access door 12 need be directly pivoted to perform a filling operation and therefore the operator need not come in direct contact with the fuel fill tube sealing member, is adequately spaced from the potential emissions of hazardous fumes and cannot inadvertently forget to replace the gas cap as would be possible with conventional gas cap arrangements.

Although described with respect to preferred embodiments of the invention, it should be readily understood that various changes and/or modifications can be made to the invention without departing from the spirit thereof. For instance, gas cap assembly 2 need not specifically incorporate tubular member 87 but could be secured to fuel fill tube 5 in various manners including providing a cap portion 41 formed of rubber or the like which is directly sealingly attached to fuel fill tube 5. In addition, cover member 48 could be differently configured within the spirit of the invention. For instance, cover member 48 could have a generally disk-shaped body and be adapted to pivot about an axis offset from the central port of fill tube 5 in a plane defined by the disk-shaped body in response to pivoting of access door 12 or a motorized opening/closing arrangement could be provided for gas cap assembly 2. Finally, tubular member 87 could be formed with an internal, reduced diameter portion, such as an inner ring connected through a plurality of circumferentially spaced and radially extending ribs, which would only permit a certain sized nozzle to be inserted therein. In general, the invention is only intended to be limited by the scope of the following claims.

We claim:

1. A gas cap assembly for selectively providing access to a filling port of a fuel fill tube located behind a pivotable access door formed as part of a vehicle body portion comprising:

a body unit sealingly engageable at the filling port of the fuel fill tube, said body unit including a central opening for receiving a fuel nozzle;

a cover member pivotally attached to said body unit through a hinge member, said cover member being pivotable between a closed position in which said cover member covers said central opening and an open position wherein a fuel nozzle can be directly inserted through said central opening into the fuel fill tube; and means for interconnecting said cover member with the pivotable access door such that opening of the access door automatically shifts said cover member from said closed position to said open position.

2. The gas cap assembly according to claim 1, wherein said body unit comprises a cap portion and an inner tubular portion with said inner tubular portion defining said central opening.

3. The gas cap assembly according to claim 2, wherein said cap portion extends about and is rotatably attached to said inner tubular portion in order to permit the hinge member that pivotally attaches the cover member to said body unit to be arranged, prior to interconnecting said cover member with the pivotable access door, generally parallel to an axis about which the access door can pivot.

4. The gas cap assembly according to claim 3, wherein said inner tubular portion includes a threaded outer surface.

5. The gas cap assembly according to claim 4, further comprising a uni-directional ratcheting mechanism interposed between said cap portion and said inner tubular portion.

6. The gas cap assembly according to claim 1, further including a spring member biasing said cover member into said closed position.

7. The gas cap assembly according to claim 1, further comprising a sealing member attached to an inner surface of said cover member.

8. The gas cap assembly according to claim 1, further comprising a pressure relief unit carried by one of said body unit and said cover member.

9. The gas cap assembly according to claim 8, wherein said cover member includes an inner surface, said pressure relief unit being fixed to the inner surface of said cover member.

10. The gas cap assembly according to claim 9, wherein said cover member includes at least one through hole extending therethrough and opening at the inner surface of said cover member, said pressure relief unit surrounding said at least one through hole.

11. The gas cap assembly according to claim 1, wherein said interconnecting means comprises a flexible tether member.

12. The gas cap assembly according to claim 11, wherein said flexible member is formed of plastic.

13. The gas cap assembly according to claim 1, wherein said interconnecting means comprises a linkage assembly pivotally connected to each of said cover member and said access door.

14. The gas cap assembly according to claim 13, wherein said linkage assembly comprises first and second linkages each of which includes first and second end portions, the first end portion of said first linkage being pivotally attached to said cover member, the second end portion of said first linkage being pivotally attached to the first end portion of said second linkage, and the second end portion of said second linkage being pivotally connected to said access door.

15. The gas cap assembly according to claim 14, wherein the first end portion of said second linkage includes a slot and the second end portion of said first linkage is pivotally and slidably connected to said second linkage through said slot.

16. The gas cap assembly according to claim 15, wherein the first end portion of said second linkage is arranged at an angle to the second end portion thereof and said second linkage is longer than said first linkage.

17. The gas cap assembly according to claim 13, further comprising a detent arrangement acting between said cover member and said body unit for releasably retaining said cover member in said open position.

18. A method of accessing a filling port of a fuel fill tube located behind a pivotable access door formed as part of a vehicle body panel comprising:

providing a gas cap assembly including a body unit having a central opening and a cover member pivotally attached to said body unit through a hinge member for movement between a closed position in which said cover member covers said central opening and an open position providing direct access to said central opening;

sealingly mounting said body unit to the fuel fill tube; and interconnecting the cover member of said gas cap assembly with the access door such that opening of said access door automatically shifts said cover member from said closed position to said open position.

19. The method according to claim 18, further comprising:

mechanically releasably maintaining said cover member in said open position.

20. The method according to claim 18, further comprising:

providing a pressure relief unit carried by said cover member.

\* \* \* \* \*

UNITED STATES PATENT AND TRADEMARK OFFICE
CERTIFICATE OF CORRECTION

PATENT NO.    : 5,735,424  
DATED         : April 7, 1998  
INVENTOR(S)   : Diederiks, Jr. et al.

Page 1 of 5

It is certified that error appears in the above-identified patent and that said Letters Patent is hereby corrected as shown below:

The title page should be deleted to appear as per attached title page.

The Drawing sheets 1-6 should be deleted to appear as per attached drawing sheets 1-3.

Signed and Sealed this

Sixteenth Day of June, 1998

*Attest:*

BRUCE LEHMAN

*Attesting Officer*         Commissioner of Patents and Trademarks

United States Patent [19]

Diederiks, Jr. et al.

[11] Patent Number: 5,735,424
[45] Date of Patent: Apr. 7, 1998

[54] FUEL PORT ACCESS DOOR CONNECTED AUTOMOBILE GAS CAP ASSEMBLY

[76] Inventors: Everett G. Diederiks, Jr., 12804 Valleyhill St., Lake Ridge, Va. 22192; Edwin E. Puett, Jr., 101 SE. Ontario Way, Stuart, Fla. 34997

[21] Appl. No.: 503,951

[22] Filed: Jul. 19, 1995

[51] Int. Cl.$^6$ ........................................... B65D 51/16
[52] U.S. Cl. ............ 220/203.01; 16/361; 16/366; 217/60 E; 220/86.2; 220/89.1; 220/259; 220/335; 220/DIG. 33
[58] Field of Search ............... 280/834; 292/268, 292/338; 215/306; 220/203.01, 203.05, 203.06, 203.21, 203.23, 86.2, 89.1, DIG. 33, 259.315, 375, 326, 335, 764; 296/97.22; 217/60 E, 60 G; 16/361, 366

[56] References Cited

U.S. PATENT DOCUMENTS

| | | |
|---|---|---|
| 574,837 | 1/1897 | Tritt . |
| 1,199,680 | 9/1916 | Fabian ............................ 220/764 |
| 1,925,079 | 9/1933 | Allred . |
| 1,978,314 | 10/1934 | Lancaster ..................... 220/259 X |
| 2,017,837 | 10/1935 | Anschicks . |
| 2,070,663 | 2/1937 | Klein et al. ..................... 220/335 X |
| 2,212,977 | 8/1940 | DeBoer et al. ................. 217/60 E |
| 2,314,710 | 3/1943 | Keller ........................ 296/97.22 X |
| 2,597,014 | 5/1952 | Mariani ......................... 220/315 X |
| 2,680,477 | 6/1954 | Schira, Jr. . |
| 2,723,746 | 11/1955 | Stevenson et al. ............ 220/315 X |
| 3,093,258 | 6/1963 | Turner ........................... 217/60 E |
| 3,140,794 | 7/1964 | Arndt et al. ...................... 220/303 |
| 3,612,338 | 10/1971 | Ekman ......................... 220/86.2 X |
| 3,813,904 | 6/1974 | Wallskog ...................... 220/326 X |
| 3,820,680 | 6/1974 | Friend . |
| 3,903,942 | 9/1975 | Vest ............................ 220/86.2 X |
| 3,905,637 | 9/1975 | Smith ............................ 296/97.22 |
| 4,040,654 | 8/1977 | Hill et al. ..................... 217/60 E X |
| 4,091,955 | 5/1978 | Sloan, Sr. . |
| 4,091,959 | 5/1978 | O'Banion . |
| 4,146,146 | 3/1979 | Mar . |
| 4,170,315 | 10/1979 | Dubach et al. . |
| 4,177,931 | 12/1979 | Evans . |
| 4,257,642 | 3/1981 | Sampson ..................... 292/338 X |
| 4,312,649 | 1/1982 | Fujii et al. . |
| 4,337,873 | 7/1982 | Johnson . |
| 4,361,252 | 11/1982 | Black et al. . |
| 4,429,933 | 2/1984 | Sokolowski ................ 217/60 E X |
| 4,432,120 | 2/1984 | Sherman, Jr. et al. . |
| 4,482,075 | 11/1984 | Stotz et al. ...................... 220/86.2 |
| 4,498,600 | 2/1985 | Blion . |
| 4,555,041 | 11/1985 | Muehl . |
| 4,576,308 | 3/1986 | Sullivan . |
| 4,653,711 | 3/1987 | Marshall . |
| 4,676,390 | 6/1987 | Harris . |
| 4,676,393 | 6/1987 | Daniel ..................... 220/DIG. 33 X |
| 4,678,097 | 7/1987 | Crute . |
| 4,705,190 | 11/1987 | Mizusawa . |
| 4,738,376 | 4/1988 | Markus . |

(List continued on next page.)

FOREIGN PATENT DOCUMENTS

306622  7/1955  Switzerland ................... 220/203.01

*Primary Examiner*—Allan N. Shoap
*Assistant Examiner*—Robin A. Hylton
*Attorney, Agent, or Firm*—Everett G. Diederiks, Jr.

[57] ABSTRACT

A gas cap assembly for use on an automobile having a pivotable gas filling port access door is provided wherein access to the filling port of the automobile's gas tank is automatically provided upon pivoting of the access door. The gas cap assembly includes a body unit that is adapted to be sealingly engaged about the filling port of the fuel fill tube associated with the gas tank and which includes a central opening for receiving a gas filling nozzle; a cover member that is movably attached to the body unit between a closed position in which the cover member is sealed against the central opening and an open position wherein direct access to the central opening is provided; and an arrangement for interconnecting the cover member with the pivotable access door such that opening of the access door automatically shifts the cover member from its closed to open positions. A spring arrangement is provided to bias the cover member towards the closed position.

20 Claims, 3 Drawing Sheets